B. F. SCHMIDT.
CURRENT CONTROL FOR MOTOR VEHICLES.
APPLICATION FILED MAR. 28, 1914.
1,150,545.
Patented Aug. 17, 1915.
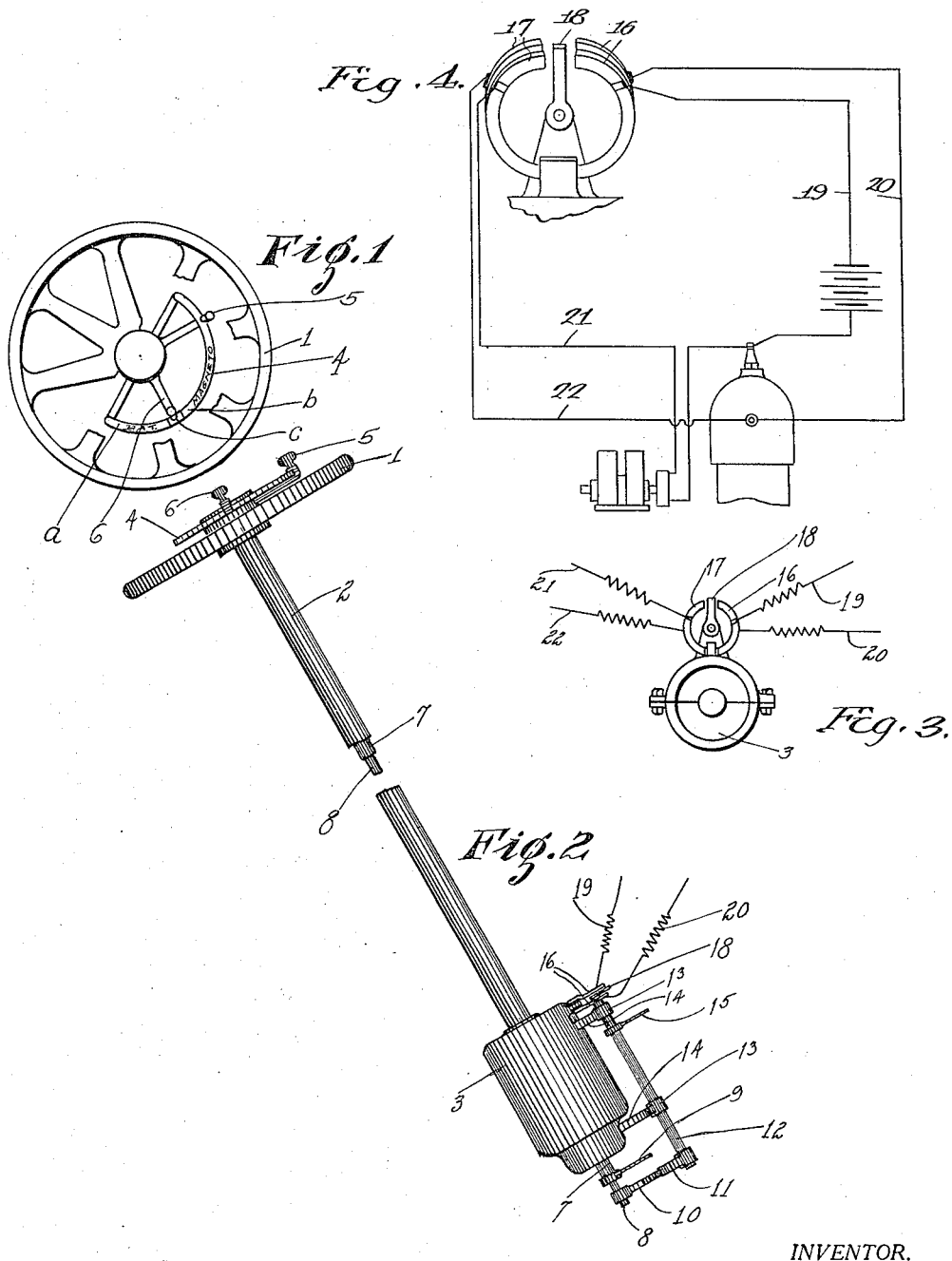
WITNESSES:
J. B. Webster
F. M. Blanchard
INVENTOR.
B. F. Schmidt
BY Percy S. Webster
ATTORNEY

UNITED STATES PATENT OFFICE.

BENJAMIN F. SCHMIDT, OF EXETER, CALIFORNIA.

CURRENT CONTROL FOR MOTOR-VEHICLES.

1,150,545. Specification of Letters Patent. Patented Aug. 17, 1915.

Application filed March 28, 1914. Serial No. 827,867.

*To all whom it may concern:*

Be it known that I, BENJAMIN F. SCHMIDT, a citizen of the United States, residing at Exeter, in the county of Tulare and State of California, have invented certain new and useful Improvements in Current Control for Motor-Vehicles; and I do declare the following to be a clear, full, and exact description of the same, reference being had to the accompanying drawings, and to the characters of reference marked thereon, which form a part of this application.

This invention relates to improvements in motor vehicles and particularly to a controlling mechanism for the ignition current used in connection with the motor of a vehicle, whereby with a retarded spark the ignition will be from the starting battery and with the advancement of the spark the same will be automatically switched from the starting battery to the magneto or other running battery connection. This will avoid the manual changing of the switch which is now done with the ordinary type of control and at the same time will give the proper current for the starting of the motor and the changed current for the normal running of the motor.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1 is a top plan view of the steering wheel of a motor vehicle showing the control levers thereon. Fig. 2 is a side elevation of a steering wheel and post showing my improved switch controlling mechanism thereon. Fig. 3 is an end view of the switch. Fig. 4 is a diagrammatic view of the ignition system in connection with which my improved structure would be used.

Referring now more particularly to the characters of reference on the drawings, the numeral 1 designates the steering wheel and the numeral 2 the steering post and the numeral 3 the steering gear housing.

The numeral 4 designates the indicating quadrant mounted in the upper end of the steering post and provided with the gas control lever 5 and the spark control lever 6. Such control lever 5 operates the rod 7 projecting through the steering post and the lever 6 controls the rod 8 projecting through the rod 7. On the lower end of the rod 7 is provided an arm 9 adapted to be linked in the usual manner to the fuel supply throttle. On the lower end of the rod 8 is a geared quadrant 10 intermeshing with another geared quadrant 11 secured on a pin 12 turnable in bearings 13 secured by brackets 13 to the housing 3. On said pin 12 is an arm 15 adapted to be linked in any suitable manner to the timer or other ignition control.

My improved switch is controlled by the operation of the pin 12 and consists of two pairs of spaced circular blades 16 and 17 respectively, there being a switch knife 18 secured on the end of the pin 10 and adapted to be moved between the members 16 and 17 with the operation of the pin 12. The wire from the starting battery or other source of initial ignition leads to either one of the members 16 or 17, being here shown as at 19, leading to one of the members 16 and, as at 20, leading to the other of said members 16, whereby when the member 18 is interposed between the members 16, a circuit will be completed. Likewise, the wire 21 from the magneto or other source of running ignition leads to one of the members 17 and from one of the other members 17, as at 22, so that when the member 18 is moved between the members 17, the circuit is completed.

The operation of the member 12 is controlled by the movement of the lever 6, suitable points being designated on the quadrant 4, as at "*a*" and "*b*", to show the relative positions. The position "*a*" for example designates the point of a retarded spark in which event the member 12 would be moved through the rod 8 and geared quadrants 10 and 11 to throw the member 18 into engagement with the member 16 thus completing the initial starting circuit. The point "*b*" would designate the advanced position of the lever 6 and when the lever 6 is moved to this position, the member 18, through the mechanism named, would be thrown into engagement with the members 17 to complete the running ignition circuit. The point "*c*" would designate the neutral position of the lever 6, at which point there would be no connection of the member 18 with either of the switches 16 or 17 so that there would be no circuit completed.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention what I claim as new and useful and desire to secure by Letters Patent is:—

A device of the character described comprising the combination with a motor having an ignition system provided with two sources of electrical energy and a switch for connecting the circuit from one source or the other, and a lever for advancing and retarding the time of the spark within said motor, of a member operable in said switch to complete the circuit from one of said sources of electrical energy or the other, said member being controlled by the operation of said lever whereby, when said lever is moved to retard or advance the time of the spark in said motor, said member will operate in said switch to make connection with one or the other of said sources of electrical energy, as described.

In testimony whereof I affix my signature in presence of two witnesses.

BENJAMIN F. SCHMIDT.

Witnesses:
JOSHUA B. WEBSTER,
VERADINE WARNER.